US011919142B1

(12) United States Patent
Newth

(10) Patent No.: US 11,919,142 B1
(45) Date of Patent: Mar. 5, 2024

(54) PUSHBUTTON-RELEASING TOOL

(71) Applicant: Gregory Lee Newth, Montague, MA (US)

(72) Inventor: Gregory Lee Newth, Montague, MA (US)

( * ) Notice: Subject to any disclaimer, the term of this patent is extended or adjusted under 35 U.S.C. 154(b) by 0 days.

(21) Appl. No.: 17/187,802

(22) Filed: Feb. 27, 2021

Related U.S. Application Data

(60) Provisional application No. 62/983,617, filed on Feb. 29, 2020.

(51) Int. Cl.

| | |
|---|---|
| ***B25G 1/10*** | (2006.01) |
| ***B25B 27/14*** | (2006.01) |
| *B08B 9/045* | (2006.01) |

(52) U.S. Cl.
CPC .............. *B25G 1/102* (2013.01); *B25B 27/14* (2013.01); *B08B 9/045* (2013.01); *B08B 2209/04* (2013.01)

(58) Field of Classification Search
CPC ......... B25B 27/02; B25B 27/10; B25B 27/14; B25B 33/00; B25B 9/00; B25B 9/04; Y10T 29/53; Y10T 29/53909; Y10T 29/53943; F16B 7/042; B25G 1/102; B08B 9/045; B08B 2209/04
USPC ............................... 29/426.5; 269/3, 5, 6, 95
See application file for complete search history.

(56) References Cited

U.S. PATENT DOCUMENTS

| | | | | |
|---|---|---|---|---|
| 5,226,230 | A | 7/1993 | Klinger | |
| 10,166,665 | B2 * | 1/2019 | Szymusiak | B25B 27/10 |
| 10,213,910 | B2 | 2/2019 | Davison et al. | |
| 2002/0064420 | A1 * | 5/2002 | Lin | B25B 27/10 403/217 |
| 2016/0238049 | A1 | 8/2016 | Bruneel | |

OTHER PUBLICATIONS

"R0-Kleen, RoGloves" catalog sheet, date unknown, 1 page, Wakefield Brush, Elyria, OH 44035 U.S.

* cited by examiner

*Primary Examiner* — Monica S Carter
*Assistant Examiner* — Alberto Saenz
(74) *Attorney, Agent, or Firm* — C. Nessler

(57) ABSTRACT

A tool comprising a nubbin, or projection, is used to press on a recessed pushbutton of a shaft coupler. In one embodiment, a circular structure or a C shape structure fits a finger of the user's hand. A nubbin extends from the structure exterior. An arch, or a pair of projections, extend transversely to the user finger length, to contact one or both adjacent fingers during use and limit rotation of the tool. Another embodiment comprises a first element and a second element, each comprising two arches connected end-to-end; the two-arch openings face each other. To fit different diameter fingers, the spacing between the two elements is adjustable; a shaft integral with one element slides within a boss that is integral with the other element.

14 Claims, 7 Drawing Sheets

PUSHBUTTON-RELEASING TOOL

This application claims benefit of provisional application Ser. No. 62/983,617, filed Feb. 29, 2020.

TECHNICAL FIELD

The present invention relates to tools for use with push-button type devices that are used to join together segments of semi-flexible shafts and for holding together telescoped tube section.

BACKGROUND

For a multiplicity of uses, it is common to have a solid or hollow shaft, whether rigid or flexible, that is fabricated as an assembly of two or more segments, enabling the shaft, to be conveniently stored and carried about. In one use, cleaning a duct or conduit such as a stove pipe or a clothes dryer vent, an artisan (also sometimes called a tradesman, mechanic, or technician) will push a cylindrical shape brush, or a whip head, along the duct length by means of a semi-rigid shaft. When the artisan desires to use a semi-rigid shaft, such as one made from plastic resin that is re-re-enforced by glass fibers, for portability and storage, a shaft is made of segments that are connected by disengageable couplers.

A typical whip head comprises a central body from which plastic or metal filaments extend radially. During use, a driver, such as an electric hand drill, rotates the shaft and attached whip head as it is moved lengthwise. U.S. patent publication 2019/0118230 A1 of the present inventor describes the duct cleaning process in connection with improved-configuration whip head and shaft couplers. The disclosure thereof is hereby incorporated by reference. A familiar coupler that is used with semi-rigid shafts is separated by pushing radially inward on a spring loaded button. See U.S. Pat. No. 10,288,133 of the present inventor. In this description, the term coupling is used interchangeably with the term coupler.

It is often an aim to keep a coupler diameter small. That can lead to coupler button that is small compared to the size of a person's finger, and the button can be positioned within a depressed cavity on the coupler exterior. When it is time to separate the shaft segments by pushing radially inwardly a coupler button, it can oftentimes be difficult to sufficiently press the button. Often an artisan is working in a difficult position (such as on a ladder or roof), or under adverse weather conditions, or the artisan may be wearing a heavy glove. Some tradesmen have resorted to use of a small tool such as the end of an Allen wrench to depress the button, which presents the problem of having available, not dropping, the Allen wrench or a like tool.

In other situations that involve other kinds of pushbutton secured (or activated) devices, it can likewise be difficult for some people to depress a button sufficiently to enable disconnection of mated parts— particularly a person with a weak finger, a "too large" finger, or a gloved finger.

There have been efforts to address the foregoing problem, in the diverse applications. Reference may be made to Davison et al. U.S. Pat. No. 10,213,910 which shows a U-shape flexible plastic tool having a more rigid nubbin that may be used to release the button on an automobile seat belt fitting. Bruneel Publication U.S. 2016/0238049 A1 shows a sleeve-like fitting that has opposing side internal nubs. Squeezing the sleeve causes the nubs to depress buttons of a telescopic pole. Szymusiak et al. U.S. Pat. No. 10,166,665 shows a device having spring loaded contact elements (nubs) that project into a U-shape opening to contact a button. Another approach has been to provide a specialized glove which has adhered to the fabric a hard nub that the wearer can press against a button.

Some of the foregoing types of solutions have disadvantages in being not sufficiently practical, or too costly, or not suited for use in environments where there is a lot of particulate debris. A simple tool that aids a user to press a button on such as a coupler or telescoping tube is needed, one which is economic to make, reasonably durable, and useful in "dirty situations" would be desirable.

SUMMARY

An object of the invention is to provide a device that makes easier the use of pushbutton couplers and telescoping shafts. A further object is to provide a tool that tradesmen and others can use to manually press on a small button that is set within, or recedes into, a cavity on the surface of a small object or shaft.

In accord with the invention, an embodiment of tool for use in depressing a pushbutton has a first element comprised of two arches, connected end-to-end. The interior arch curve surfaces face in a first direction A and are shaped for receiving and partially encircling two adjacent fingers of a user. A nubbin (a small post or peg) extends lengthwise, generally radially outwardly, from the exterior surface of one of the arches in second direction B which is approximately opposite direction A. Preferably, an incline surface and a concave depression are at the tip of the nubbin. A second element connects to, or is mated with, the first element, and the combination of elements keeps the tool in engagement with the user's finger(s) during use.

In an embodiment, a tool is one piece, wherein the second element is integral with the first element. The second element may comprise a third arch that is continuous with the first arch or second arch of the first element, to form a full ring or a ring with a gap (which may be said to have a C shape). The combination of first arch and third arch encircles or substantially encircles a user first finger. The second arch rests against an adjacent finger and rotationally stabilizes the tool during use.

In another embodiment, the second element comprises a separate two-arch piece and there is an adjustable space between the two elements, for receiving the user fingers. For example, the first element has a shaft running in direction A from where the first and second arch are connected and a nubbin that extends lengthwise in direction B (which is opposite direction A) from the exterior surface of one of the arches. The second element, which is also called the collar, comprises a third arch and a fourth arch, connected end-to-end; with the interior arch curve surfaces facing in direction B. The collar comprises a boss that slides along the shaft. The collar is held at a desired location by frictional force which the user may overcome for adjusting the spacing for two adjacent user fingers.

In further accord with the invention, a ring having a nubbin is shaped for slipping onto a user's finger has an arch that extends outwardly, to engage an adjacent finger. Or, two pairs of projections extend outwardly to define opposing side depressions for adjacent fingers to set into. Both alternatives maintain the orientation of the nubbin so it will be effective.

In the method of using the aforementioned devices: the user engages at least two fingers with the tool so that the nubbin faces in the same direction as the user's palm. The user grasps a shaft at the coupling or grasps a telescoping tube, and the user manipulates his hand so the nubbin contacts and depresses the button of the coupling while simultaneously pulling on the pieces which the button holds together.

DESCRIPTION

The present invention is described in connection with a semi-rigid shaft that is commonly used by an artisan to clean ducts and the like, where the shaft comprises segments that are joined to each other by couplers. The invention will have utility in other fields, as mentioned below and in the Background. The main components of the present invention are preferably made of molded thermoplastic or thermoset resin. Alternatively, metals may be used.

Figure 1:
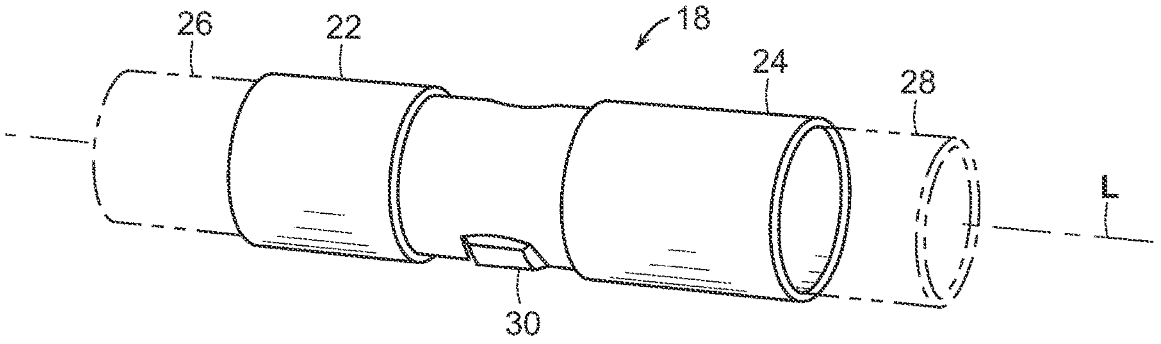
FIG. 1 PRIOR ART
FIG. 1 a is a side view of a coupler comprising two halves engaged with each other.
Figure 2:
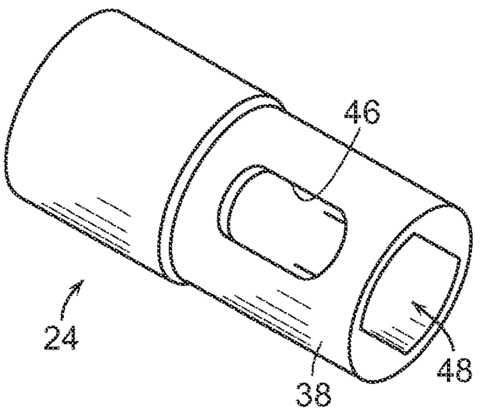
FIG. 2 PRIOR ART
FIG. 2 shows a first half coupler of the coupler of FIG. 1.
Figure 3:
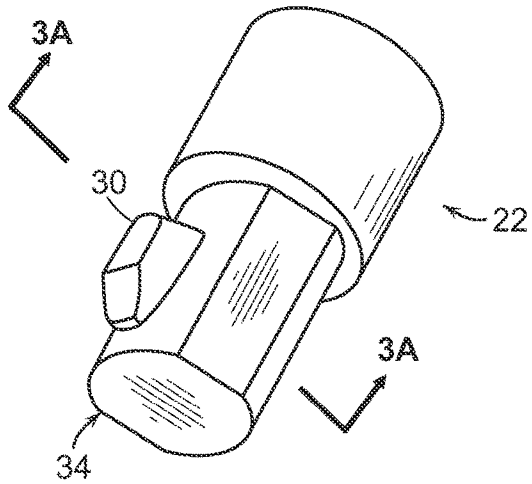
FIG. 3 PRIOR ART
FIG. 3 shows the second half coupler of the coupler of FIG. 1
Figure 3A:
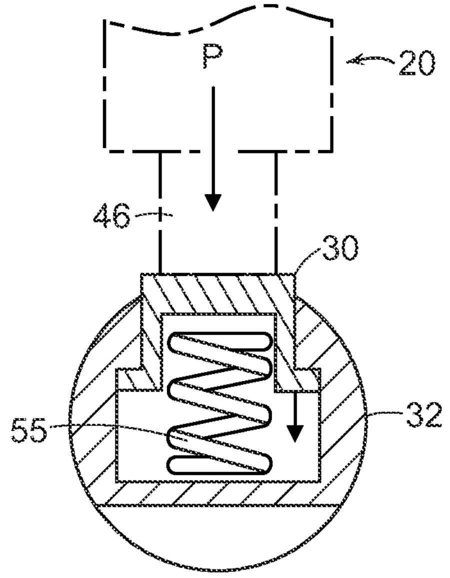
FIG. 3A PRIOR ART
FIG. 3A is a transverse cross section of the half coupler of FIG. 3.
Figure 3B:
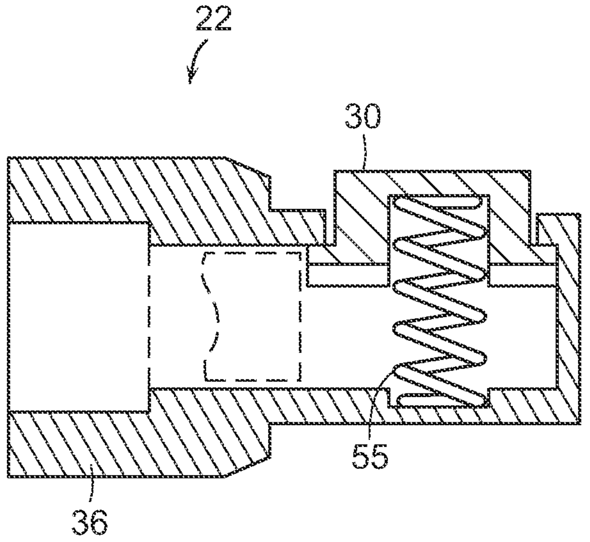
FIG. 3B PRIOR ART
FIG. 3B is a lengthwise cross section of the half coupler of FIG. 3.

FIG. 1 shows a coupler 18 (also called coupling 18) which is an assembly comprised of a male half coupler 22 and female half coupler 24. FIG. 2 and FIG. 3 shows each separate part. Shaft sections 26, 28 are attached respectively to half couplers 22, 24. To form a coupling, end 34 of part 22 slides into the cavity 48 of female part 24. As the end 34 is inserted, the bore of part 24 causes spring loaded button 30 to be depressed. The button then springs radially outwardly within opening 46 of part 24, thus holding the half coupler portions to each other. FIG. 3A and FIG. 3B are respectively transverse and lengthwise cross sections of male half coupler 22 showing how spring 55 urges button 30 outwardly. FIG. 3A shows a portion of tool 20, which is discussed next, in phantom. Further information about button couplers can be obtained from See U.S. Pat. No. 10,288,133 of the present inventor, the disclosure of which is hereby incorporated by reference.

Figure 4:
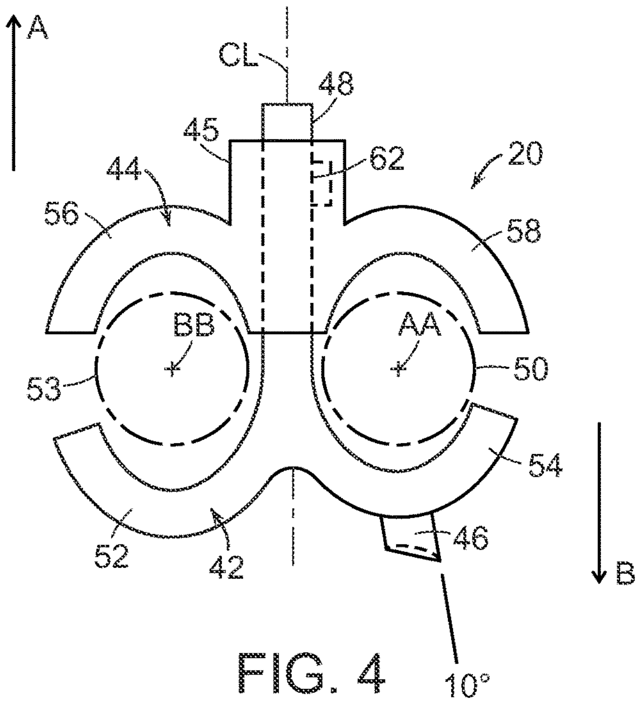
FIG. 4 is an end view of an adjustable-size two-piece tool comprising a nubbin for pressing on a coupler button while it is mounted on the user's fingers.
Figure 4A:
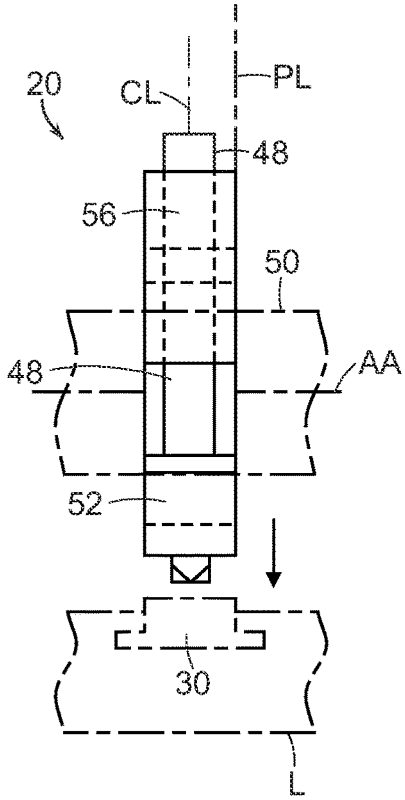
FIG. 4A is a side view of the FIG. 1 tool.

Tool 20, an embodiment of the invention, is shown in FIG. 4 end view and FIG. 4A side view. Tool 20 is comprised of two mating elements, namely yoke 42 and collar 44. Each piece in end view comprises two interconnected arches, namely arches 56, 58 of the collar and arches 52, 54 of the yoke 42. The mated collar and yoke from two side-by-side openings for receiving the fingers of a user (artisan). FIG. 4 and FIG. 4A show a phantom of finger 50, having nominal centerline length axis AA. FIG. 4 shows second adjacent finger 53 of the artisan, having nominal centerline length axis BB. (A reference herein to first finger and second finger is that same as referring to a first part and a second part, which does not specify the order in which they may be arranged relative to one another. Thus, a first finger in this description is not necessarily the finger of a hand which is adjacent the thumb, as is the "first finger" in common anatomical parlance.)

Figure 13:
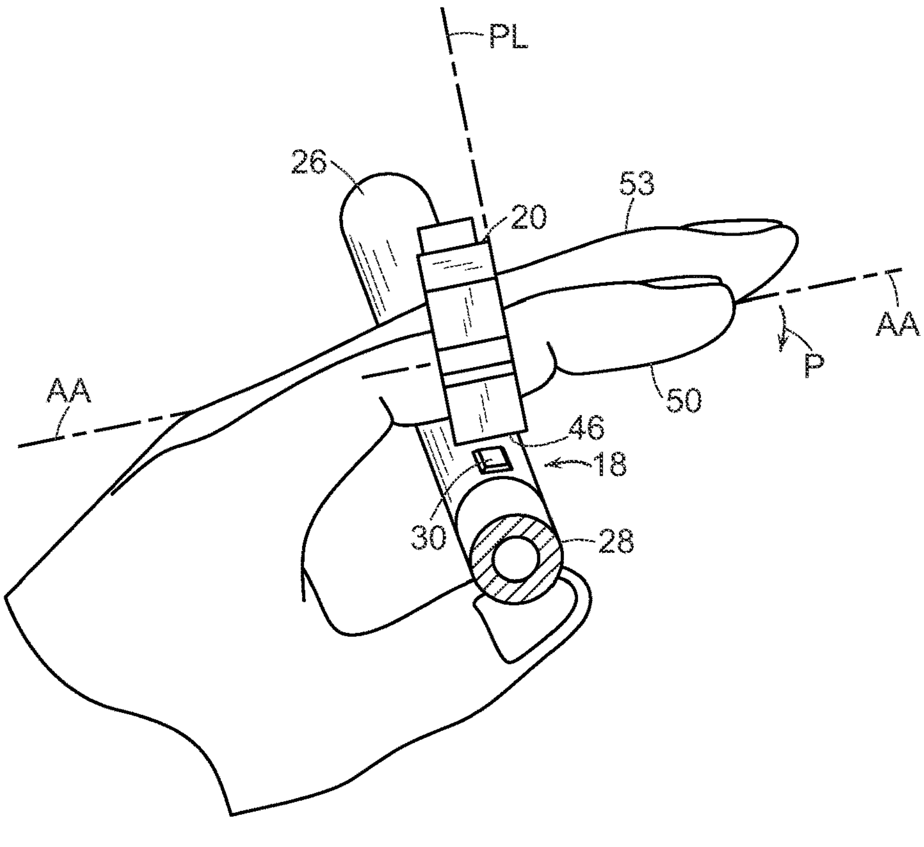
FIG. 13 is a perspective view of an artisan's hand using the FIG. 4 tool to press the button of the FIG. 1 coupler.

FIG. 13 illustrates a use of the tool when mounted on an artisan's fingers: The artisan positions the nubbin over the button 30 of a coupling 18. Then, by closing the fingers of his hand—a motion that is along the lines of grasping the coupling—the artisan presses the tip of the nubbin against pushbutton 30 of the coupler to depress it. Then, by user or an assistant pulling one or both portions of the shaft lengthwise (transverse to the direction in which the user's fingers run), the two parts of the coupling may be separated from each other. Similarly, the length of a telescoping tube shaft may be changed.

In one manner of characterizing the present inventions herein, there are two elements. A first element comprises two interconnected arches, the arch curves of which face in a first direction, for example direction A in FIG. 4. The nubbin extends in direction B which is approximately opposite direction A; within that scope, an exemplary nubbin may run at an about 10 degree angle to the direction which is exactly opposite direction A. The second element is that which keeps the tool (i.e., the combination of the first and second elements) in engagement with the user fingers. The second element may be in part or whole integral with the first element. As with tool 20, the second element enables adjustment of the finger opening. For further understanding, a first arch and second arch are sometimes described as being connected end-to-end. Thus one end of each arch is at the point of connection, and the other end is free. Thus an element comprising two end-to-end connected arches has opposing free ends, those free ends being the unconnected end of the first arch and unconnected end of the second arch.

Referring again to tool 20 and FIG. 4 and FIG. 4A: The tool is symmetrically shaped about the center line CL. Nubbin 46, a short cantilever post, extends downwardly in the Figure from the exterior of a lower arch curve portion 54 of tool 20. As illustrated by FIG. 13, when the artisan is "wearing" the tool as he would a pair of yoked finger rings or brass knuckles, the nubbin faces inwardly within the artisan hand (nominally toward the thumb).

Referring again to FIG. 4 and FIG. 4A, yoke 42 comprises shaft 48, making the yoke, in end view, vaguely in the shape of an upside down T. Collar 44 comprises a boss 45 that has a through hole within which shaft 48 is slidably received. When the collar is moved along shaft 48, that enables change in spacing between the yoke arches 52, 54 and the opposing collar arches 56, 58. Thus, tool 20 can be adjusted to fit a particular user-artisan's fingers 50, 53.

Each arch has a face, which is a surface seen in end view (for example, those surfaces which are presented in the a view of FIG. 4 that face in the same direction as the finger lengths run within the arch-defined openings of the tool.

Preferably, those arch faces will lie along plane PL, as shown in FIG. 4A. In embodiment variations, there may be some angling and or planar offset of the faces of the arches of an element or of an arch of a first element and an arch of a second element.

Figure 5:
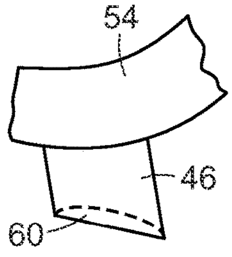
FIG. 5 is a detail end view of the nubbin portion of the FIG. 4 tool.
Figure 6:
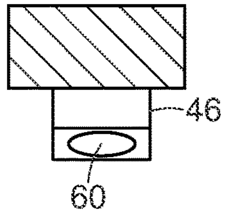
FIG. 6 is a detail side view of the nubbin portion of the FIG. 4 tool.

Nubbin 46, which extends outwardly from the exterior surface of arch 54 may alternatively extend likewise from arch 52. Preferably, as shown by FIG. 5 and FIG. 6, nubbin 46 is positioned outwardly from the lowest exterior surface of the arch and is angled at a nominally 10 degree angle to the axis of the shaft. Preferably, the tip has an end that is inclined to the nubbin length axis and there is a concavity 60 at the nubbin tip, better to fit the projecting parts of certain coupling buttons. Alternatively, a nubbin may have a planar or slightly rounded (convex) end. The transverse cross section of a nubbin may be round, square, rectangular, polygonal, or other shape. A nubbin may taper inwardly with distance from its point of attachment to the arch of the tool.

Figure 7:
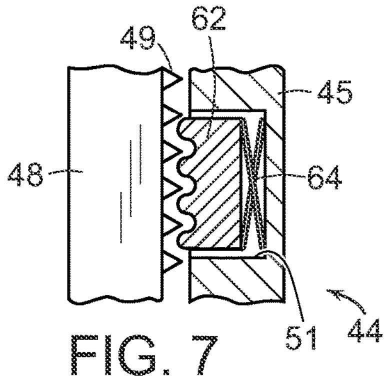
FIG. 7 is a partial view in part cutaway cross section of the FIG. 4 tool, showing the yoke and releasable means for holding the yoke shaft in place.

As shown by the fragmentary tool cross section of FIG. 7, shaft 48 of yoke 42 has rounded-tip serrations 49 along as vertical-running edge. And there are mating rounded serrations on the end of button 62, which is set within the bore of the blind hole of boss 45 of collar 44. Captive spring 64 causes button 62 to resiliently apply force to shaft, thus hindering the shaft from sliding. By pulling or pushing lengthwise in the direction of the length of shaft 48, an artisan can overcome the resilient frictional force applied by the button at the interface of the serrations, and can cause the button to retract into its blind hole, thus allowing the yoke to move, thus changing the size of the finger openings to suit the artisan.

Figure 7A:
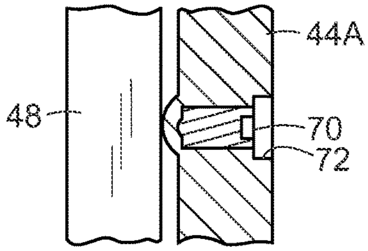
FIG. 7A is a view like FIG. 7 showing another embodiment of the yoke holding means.

Other means for frictionally inhibiting movement of the collar/boss relative to the yoke/shaft may be used that enables manual spacing adjustment without use of a separate tool. FIG. 7A shows such another embodiment. A blind tapped hole 72 in the boss 45 or other portion of collar 44 has within it a set screw which, when precisely tightened, deforms the wall of the bore as shown in exaggerated fashion, causing the wall to press against yoke shaft 48. Thus, the screw indirectly presses on the shaft. In another alternative (not shown) there is a threaded through hole in the collar for a set screw, preferably having a Nylon tip and the tip presses directly on the shaft. In still another embodiment, also not shown, there is a threaded taper collar at the top of the boss that locks the shaft. It will be understood, that within the invention, the yoke and collar may be locked relative to one another in a way that moderate force is unable to change the spacing, and that manual release of the shaft securing means is required.

Thus, the artisan can change the spacing between the collar and yoke so the spaces between the arches of the two parts fit his fingers 50, 53 even if the artisan has gloves on.

As mentioned, when the tool is adjusted and positioned suitably on the artisan fingers, the artisan uses tool 20 as illustrated by FIG. 13 and FIG. 4A.

Figure 8:
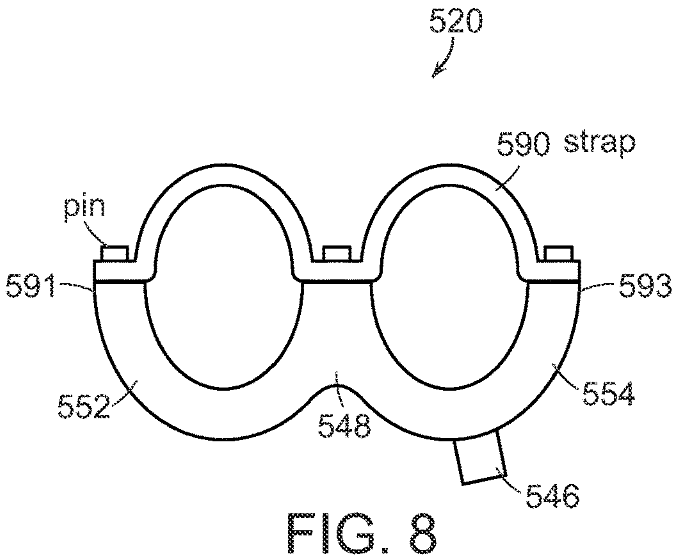
FIG. 8 is an end view of a tool comprising two connected arches and a strap for holding the tool in engagement with fingers of a user.

FIG. 8 shows a tool 520 wherein the first element comprises first arch 554 and second arch 552 that are connected end-to-end at location 548, that have opposing free ends 591 and 593, and nubbin 546. The second element is a strap 590 that runs from pinned locations at end 591 of the first element, at the midpoint of the first element, and then to the end 593. In an alternative, not shown, there is no attachment at the center location; or the strap only runs across the ends of one arch. It will be appreciated that a strap or the like may be employed in other embodiments in place of exemplary semi-rigid plastic structures.

FIG. 8A shows tool 620 wherein the first element comprises end-to-end connected arches 652, 653 and nubbin 646; the second element comprises end-to-end connected arches 656 and 658. The second element is held against the first element by pins 680 and associated springs 682. The left side of the Figure shows the screw and spring in exploded fashion.

Figure 9:
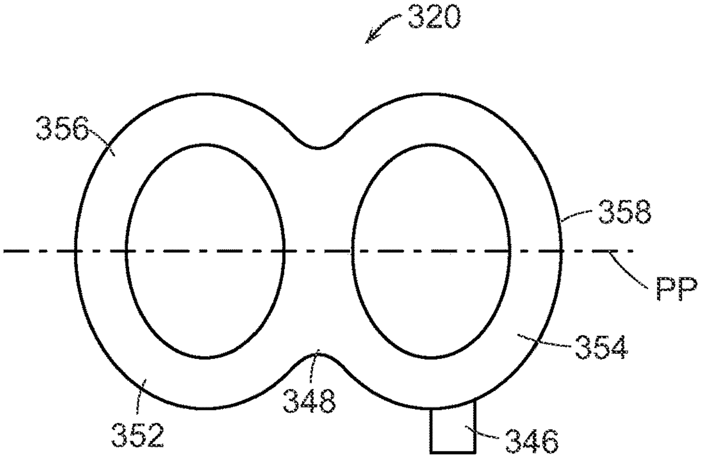
FIG. 9 is an end view of a one-piece two-finger/ring tool having a nubbin.
Figure 9A:
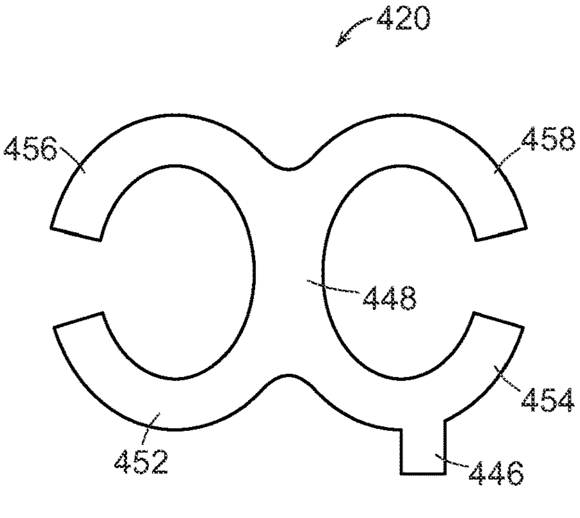
FIG. 9A is an end view of a one piece two-finger tool where the joined-together finger-receiving portions are C shape (rings with gaps).

Other embodiments of the invention will be also useful. For example, tool 320 in FIG. 9 is one-piece; it comprises finger-ring 357 and finger-ring 359 that are integrally joined to each other by spine 348. Nub 346 extends from ring 359. As another example, FIG. 9A shows tool 420 comprises two C shape sections in place of the rings of tool 320. The first ring is formed by arch 456 and a mating arch 452; the second ring is formed by arch 458 and mating arch 454 (from which nubbin 446 extends). Different size tools 320, 420 may be provided to fill artisan needs.

Figure 10:
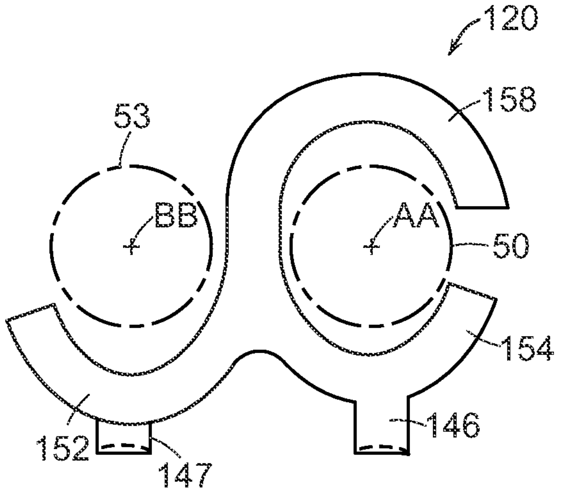
FIG. 10 is an end view of a one piece tool comprising a C shape portion (ring with gap) for a first finger and an integral arch portion for pressing against a second adjacent finger.

FIG. 10 is an end view and FIG. 10A is a side view of tool 120, another embodiment of a non-adjustable one piece tool. The portion of tool 120 comprising arch 158 is opposed by the integral arch portion 154. Tool 120 has integral curved stabilizing arm 152 that extends from arch 154 rests against the underside of an adjacent finger. Stated another way, tool 120 has two adjacent arches 152, 154 against which the user's fingers press in the Figure downward direction, and one apposing arch 158. The arches 154, 158 cooperate to keep the tool mounted on the user finger 50. Nubbin 146 extends outwardly from arch 154. FIG. 10 also illustrates another alternative configuration which may be applied to the two-ring tool embodiments previously discussed. An optional or alternative second nubbin 147 extends from the exterior of the second arch curve 152, in addition to nubbin 146.

In a variation of 120, there is no gap between the portions 158 and 154 and thus the connected arches 156, 154 will define a ring around finger 50. And the curve of arch 152 may alternatively face downwardly in the Figure. Reference is made to analogous tool 220 discussed next.

Figure 11:
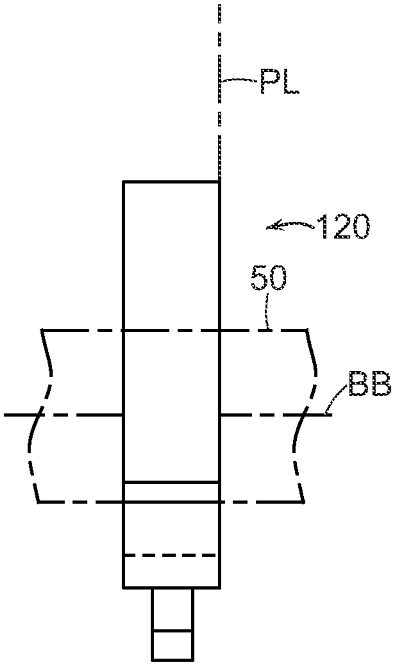
FIG. 11 is a side view of the tool of FIG. 10.

FIG. 11 shows in end view an embodiment of non-adjustable tool 220 that comprises circular ring 258 from which extends nubbin 246. The opening of the ring 258 is fixed at a size which accommodates certain finger 50 cross section. Tool 220 comprises integral arch 256 that is configured for contacting finger 53, to thereby rotationally stabilize the tool on the user's hand.

A further variation of tool 120 may be alternatively constructed as adjustable-finger-size opening, along the lines of tool 20 of FIG. 4, where the arches 152, 154 have a shaft and arch 158 extends from a boss that moves along the shaft.

Figure 12:
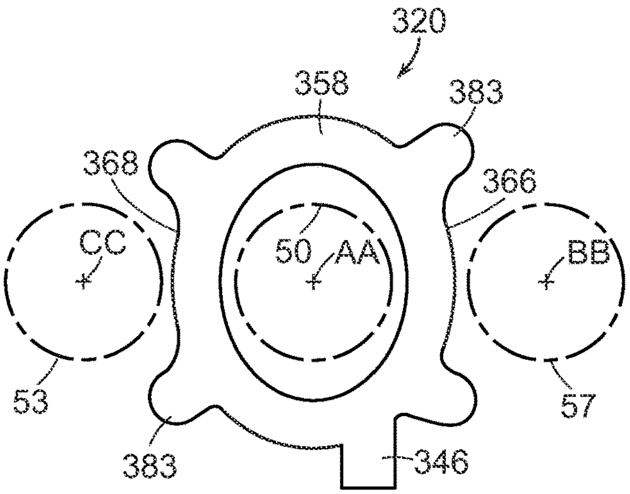
FIG. 12 is an end view of one piece tool with a nubbin for pressing on a button and other projections to contact adjacent fingers and thereby rotationally stabilize the tool when mounted on a user's first finger.

FIG. 12 is an end view of tool 320, an embodiment that comprises a ring 358 that defines an opening sized to accommodate certain finger 50 cross sections. Nubbin 346 projects downwardly from the ring exterior. The exterior of the ring has two pairs of nubs 383 which define opposing side depressions 366, 368 that are shaped for contact with adjacent fingers 57 and 53 having centerlines BB and CC respectively), and the four exterior projections 371 that define those depressions will, by contact with adjacent fingers, limit rotation of the tool.

Figure 14:
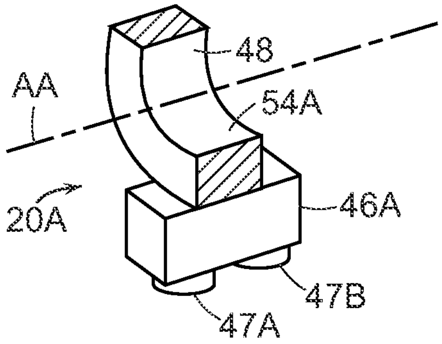
FIG. 14 is a perspective view of a fragment of a tool like that of FIG. 4 that has an elongate nubbin from which project two protuberances.

FIG. 14 is a partial cross section of tool 20A, showing a nubbin 46A which has a lengthwise (i.e., parallel to finger-axis) dimension that is greater than the lengthwise thickness of the arch 54A from which it projects. Optionally, one or both integral protuberances 47A, 47B may extend from the nubbin; in effect they are sub-nubbins.

Figure 15:
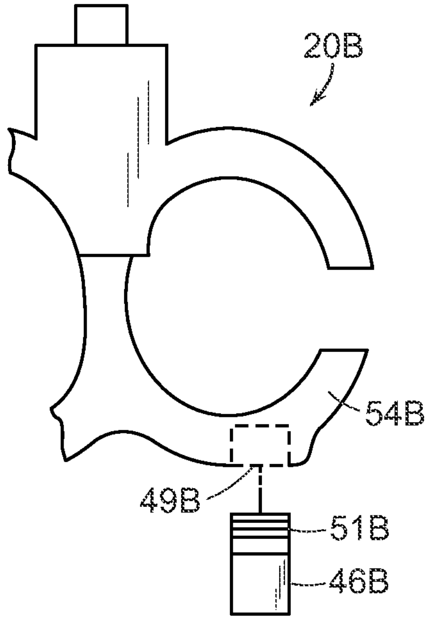
FIG. 15 is a side view of a tool like that of FIG. 4, showing a threaded and thus replaceable nubbin.

FIG. 15 shows a portion of tool 20B which is a modification of tool 20, showing a nubbin 46B that has a threaded end 51B, to screw into threaded hole 49B in the arch 54B. The nubbin variations of FIG. 14 and FIG. 15 may be applied to other embodiments which are described herein.

Tools of the present invention may be made of a thermoplastic such as polypropylene; alternately a thermoset plastic such as ABS; alternately structural metal or ceramic material; alternately combinations of the foregoing materials.

While the invention is described in connection with shafts for cleaning ducts, the invention will have utility in other fields, for example, in connection which telescoping shafts that have changeable lengths, as may be used in such as a camera tripod or a collapsible tubular-frame "walker" used by an infirm person. A spring-loaded button is often referred to as a detent when it is used to adjust the length of a telescoping tube, or to adjust the position of a collar along the length of a tubular member.

The invention, with explicit and implicit variations and advantages, has been described and illustrated with respect to several embodiments. Those embodiments should be considered illustrative and not restrictive. The invention is pictured and described in particular orientations;

terms such as top and bottom shall not be limiting as the tool of the invention may be stowed or used in any orientation. Any use of words such as "preferred" and variations suggest a feature or combination which is desirable but which is not mandatory. Thus, embodiments lacking any such preferred feature or combination may be within the scope of the claims which follow. Persons skilled in the art may make various changes in form and detail of the invention embodiments which are described, without departing from the spirit and scope of the claimed invention.

What is claimed is:

1. A tool, for manually depressing a button of a coupling of a segmented shaft when the tool is mounted on one or more fingers of a hand of a single user, which comprises:

(a) a first element comprising a first arch, having an arch curve interior surface shaped for partially encircling a first finger of said single user;

a second arch, having an arch curve interior surface shaped for partially encircling a second finger of the single user; wherein the first arch and second arch are connected end-to-end at a first location, with the arch curve interior surface of each arch facing in a first direction A; and, at least one nubbin, having a length, extending lengthwise from the first arch in a second direction B which is approximately opposite to the first direction A;

(b) a second element comprising means for continuously engaging the first element with at least said first finger;

wherein the second element is connected to or integral with the first element; and, wherein the first element and second element in combination limit movement of the tool with respect to said first finger in the first direction A and in the second direction B.

2. The tool of claim 1 wherein the second element comprises:

a third arch, having an arch curve interior surface shaped for partially encircling said first finger;

a fourth arch, having an arch curve interior surface shaped for partially encircling said second finger;

wherein the third arch and the fourth arch are connected end-to-end at a second location, with the arch curve interior surface of each arch facing in said second direction B; and wherein the second element is connected to first element to define a space for said first finger between third arch and the first arch and to define a space for said second finger between the fourth arch and the second arch.

3. The tool of claim 1 wherein the second element comprises:

a third arch, having an arch curve interior surface shaped for partially encircling the first finger;

a fourth arch, having an arch curve interior surface shaped for partially encircling said second finger;

wherein the third arch and the fourth arch are connected end-to-end at a second location, with the arch curve interior surface of each arch facing in said second direction B;

a boss having a bore, attached to or integral with the third arch and fourth arch at said second location;

wherein the first element has opposing free ends which comprise an end of the first arch and an end of the second arch;

wherein the first element further comprises a shaft having a length axis extending in direction A from said first location, said shaft configured for slidably moving lengthwise within the bore of the boss of the second element, to enable change in the spacing between the first element and the second element, thereby to define an adjustable size space for each of said first finger and said second finger.

4. The tool of claim 3 further comprising means for frictionally inhibiting lengthwise movement of the shaft within the boss.

5. The tool of claim 4 wherein the means for frictionally inhibiting lengthwise movement is selected from the group comprising (a) a spring loaded button having a serrated end that presses on a lengthwise running surface of the shaft and (b) a threaded screw having an end that directly or indirectly presses on a lengthwise running surface of the shaft.

6. The tool of claim 3 wherein the at least one nubbin extends lengthwise at an angle of up to about 10 degrees to the length axis of the shaft.

7. The tool of claim 1 wherein the second element is a third arch having an arch curve interior surface shaped for partially encircling said first finger and facing in said second direction B, the third arch having a first end and a second end, the first end secured to or integral with the first element at said first location, wherein the combination of first arch and third arch define a space shaped for partially or fully encircling said first finger.

8. The tool of claim 7 wherein the second end of the third arch is secured to the first arch to thereby define a ring shaped for fully encircling said first finger.

9. The tool of claim 1 wherein the first arch has a face and the second arch has a face, wherein said faces are coplanar.

10. The tool of claim 1 wherein the at least one nubbin extends to a tip having a surface that is at an incline to the length thereof; and wherein the tip comprises a concave depression.

11. The tool of claim 1 wherein the at least one nubbin is detachably secured to the first arch by a means of a threaded end inserted into a threaded hole.

12. A method for manually changing the length of a telescoping shaft comprised of telescoping tubular pieces that are secured by a pushbutton to each other when the shaft has a selected length, which comprises:

(a) providing a tool of claim 1;

(b) mounting the tool on said hand of the single user so the first arch curve is in contact with the single user's first finger;

(c) positioning the single user's hand relative to a said telescoping shaft, so the at least one nubbin is in contact with the pushbutton of the telescoping shaft; and, (d) actuating the single user's hand to cause the at least one nubbin to depress said pushbutton while simultaneously applying lengthwise force to the shaft.

13. A method for manually uncoupling a segmented shaft comprised of segments that are connected by a coupler that comprising a pushbutton, which comprises:

(a) providing a tool of claim 1;

(b) mounting the tool on said hand of the single user so the first arch curve is in contact with the single user's first finger;

(c) positioning the single user's hand relative to a said shaft, so the at least one nubbin is in contact with the pushbutton; and, (d) actuating the single user's hand to cause the at least one nubbin to depress the pushbutton while simultaneously applying lengthwise force to the segmented shaft.

14. A tool, for manually depressing a button of a coupling or telescoping tubular structure when mounted on one or more fingers of a single user, which comprises:

(a) a first element comprising a first arch, having an arch curve interior surface shaped for partially encircling a first finger of said single user;

a second arch, having an arch curve interior surface shaped for partially encircling a second finger of said single user; wherein the first arch and second arch are connected end-to-end at a first location with the arch curve interior surface of each arch facing in a first direction A; and, at least one nubbin, having a length, extending lengthwise from the first arch or from the second arch in a second direction B which is approximately opposite said first direction A;

(b) a second element comprising a third arch having an arch curve interior facing in said second direction B, the third arch connected to the first element at least at said first location;

wherein the first element and second element combine to limit movement of the tool in the first direction A and in the second direction B with respect to said first finger.

* * * * *